United States Patent [19]
Eick et al.

[11] Patent Number: 5,937,064
[45] Date of Patent: Aug. 10, 1999

[54] SYSTEM AND METHOD FOR INTERACTIVE VISUALIZATION, ANALYSIS AND CONTROL OF A DYNAMIC DATABASE

[75] Inventors: Stephen G. Eick; Audris Mockus; Todd L. Graves, all of Naperville, Ill.; Alan F. Karr, Chapel Hill, N.C.

[73] Assignee: Lucent Technologies, Inc., Murray Hill, N.J.

[21] Appl. No.: 08/805,842

[22] Filed: Mar. 3, 1997

[51] Int. Cl.[6] .................................................... H04L 9/00
[52] U.S. Cl. ................... 380/9; 380/49; 707/513
[58] Field of Search .................. 345/326, 331, 345/338, 440, 526; 380/9, 49; 707/511–513, 530

[56] References Cited

U.S. PATENT DOCUMENTS

| | | | |
|---|---|---|---|
| 5,469,538 | 11/1995 | Razdow | 345/440 |
| 5,537,526 | 7/1996 | Anderson et al. | 345/331 |
| 5,537,529 | 7/1996 | Borovoy et al. | 345/326 |
| 5,638,504 | 6/1997 | Scott et al. | 345/356 |
| 5,844,555 | 12/1998 | Menaker et al. | 345/338 |

*Primary Examiner*—Salvatore Cangialosi

[57] ABSTRACT

Real time data summaries from a common data base are produced within a network. A line document program is stored within the network enabling selective visual analysis and displays of the data when the data when the data summaries are downloaded at computer terminals at a plurality of sites.

20 Claims, 4 Drawing Sheets

| Cases | Count | Added | Deleted | Same |
|---|---|---|---|---|
| 00 | 1011 | 15.2176 | 6.909 | 2034.96 |
| 01 | 617 | 19.0032 | 7.01621 | 1818.82 |
| 02 | 381 | 25.1601 | 7.12598 | 1840.7 |
| 03 | 1248 | 24.496 | 5.97177 | 2255.23 |
| 04 | 1246 | 11.6426 | 4.52846 | 2288.39 |
| 05 | 1267 | 14.2172 | 4.51685 | 2758.64 |
| 06 | 1439 | 14.2073 | 5.87244 | 2886.48 |
| 07 | 2108 | 19.6186 | 6.30835 | 2665.73 |
| 08 | 5765 | 17.8857 | 7.166 | 2388.85 |
| 09 | 9327 | 16.3059 | 6.04707 | 2221.12 |
| 10 | 12617 | 18.647 | 6.09297 | 2184.04 |
| 11 | 11002 | 18.0262 | 7.62143 | 2159.33 |
| 12 | 9374 | 18.0616 | 7.16791 | 2202.76 |
| 13 | 12654 | 19.3917 | 7.61253 | 2185.2 |
| 14 | 14367 | 19.0109 | 6.58453 | 2262.41 |
| 15 | 14772 | 23.4784 | 8.8181 | 2224.17 |
| 16 | 13251 | 23.7092 | 6.23893 | 2123.71 |
| 17 | 8352 | 22.424 | 7.28341 | 2099.76 |
| 18 | 4417 | 21.8927 | 8.20127 | 2214.69 |
| 19 | 2914 | 20.7876 | 7.29719 | 2098.79 |
| 20 | 2298 | 21.2141 | 8.2785 | 2233.64 |
| 21 | 2362 | 17.2921 | 8.99788 | 2347.09 |
| 22 | 2014 | 18.639 | 5.72393 | 2269.52 |
| 23 | 1602 | 27.0006 | 5.07054 | 2051.32 |

This table shows numbers of changes for different hours of the day. First column shows hours since midnight, second – numbers of changes, and third to fifth columns contain average (over all changes for that hour) numbers of added, deleted, and unchanged lines. To make bar lengths be more uniformly distributed we can select square root (sqrt) transformation [Linear ▢]

*FIG. 3*

SYSTEM AND METHOD FOR INTERACTIVE VISUALIZATION, ANALYSIS AND CONTROL OF A DYNAMIC DATABASE

BACKGROUND OF THE INVENTION

This invention pertains to a system and method for visual analysis of a database.

Currently, visualization analysis of a database is achieved by acquiring data and then using a visualization application to perform the desired analysis. The problem with the current approach, is that the data is frequently out of date by the time it is received and it is very difficult to obtain data in this manner particularly when data includes sensitive information. Furthermore, visualization applications are limited to the programs provided by the designers of the applications. It is somewhat difficult for the client to obtain the type of visualization application that is directed to the needs of the client especially when dealing with complex and voluminous data.

Presently, many databases including multimillion line source code from large real-time software systems are stored and maintained. The source code for such systems, included in the databases has experienced substantial development over the last two decades. The code is partitioned into tens of thousands of files, thousands of modules and tens of subsystems. The code is dynamic and constantly changing. Modifications are frequently submitted daily by the thousands of engineers involved in projects associated with the databases. The database contains the complete change history, including virtually every modification made during the project, as well as many related statistics.

Often, corporate data base assets are warehoused centrally, because of their strategic nature and interest to many organizations, and at the same time, these organizations have differing needs in connection with the data, differing skills levels, and varying tasks to perform. This is true of the source code database, which must be accessed by multiple constituencies for multiple reasons. Since documentation associated with the database is often out of date, the code itself is the most reliable source of information about the product. Programmers making changes need access to ensure that proposed changes do not affect existing functionality. Additionally, project managers monitor code changes to access whether promised features are on schedule and whether delivery deadlines will be met. Finally, engineers study the code to identify bug-prone regions, unused dead code and inefficiencies.

There are a number of different classes of clients who would be interested in assessing a database to perform a visualization analysis. As mentioned, one client, a developer wishes to develop, modify or enhance software code included in the database. Another client, a customer or other user who wishes to do visualization analysis of the database for purposes of some commercial business analysis. In most situations, the proprietor of the database may want different levels of security or restrictions on the information made available to each of these clients from the database.

An example, is information contained in a financial institution database where one client working for the institution may be making changes to codes for the programs which permit, for example, automated service to customers concerning status of accounts, while another client may desire to obtain a visualization analysis from the database for purposes of making a business decision concerning the promotion of products in a specific market. For example, information relating to financial income levels or account activity in a certain geographic area could be useful in determining how and what type of a product to promote within that geographic area. Other examples could include a planner of a governmental agency who wishes to prepare a demographic analysis using visual interactive analysis to develop a plan for roads. The possibilities are unlimited.

Both clients have a need to obtain data in real time that is current information not information that is outdated.

Accordingly, there is a need for a system and method that will provide to a variety of clients access to information from a database in real time in accordance with security requirements required by the proprietor of the database for purposes of allowing the clients to perform permitted interactive visualization analysis by way of the programs made available to the client.

SUMMARY OF THE INVENTION

This need is met by the system and method in accordance with present invention, wherein a user or client is able to engage in an interactive visualization and analysis of a database with an application operating on data in real time.

In accordance with one aspect of the present invention a document is downloaded using a standard network such as a web infrastructure with as a common gateway interface with the live document being read on a standard web browser.

Yet another aspect of the present invention, the author of a document provides restrictions on access to sensitive information in the database.

These and other features and advantages of the present invention will become apparent from the following detailed description, accompanied drawings and the appended claims.

BRIEF DESCRIPTION OF THE DRAWINGS

FIG. 3 is a graphical representation associated with a version of the invention.

DESCRIPTION OF THE INVENTION

Figure 1:
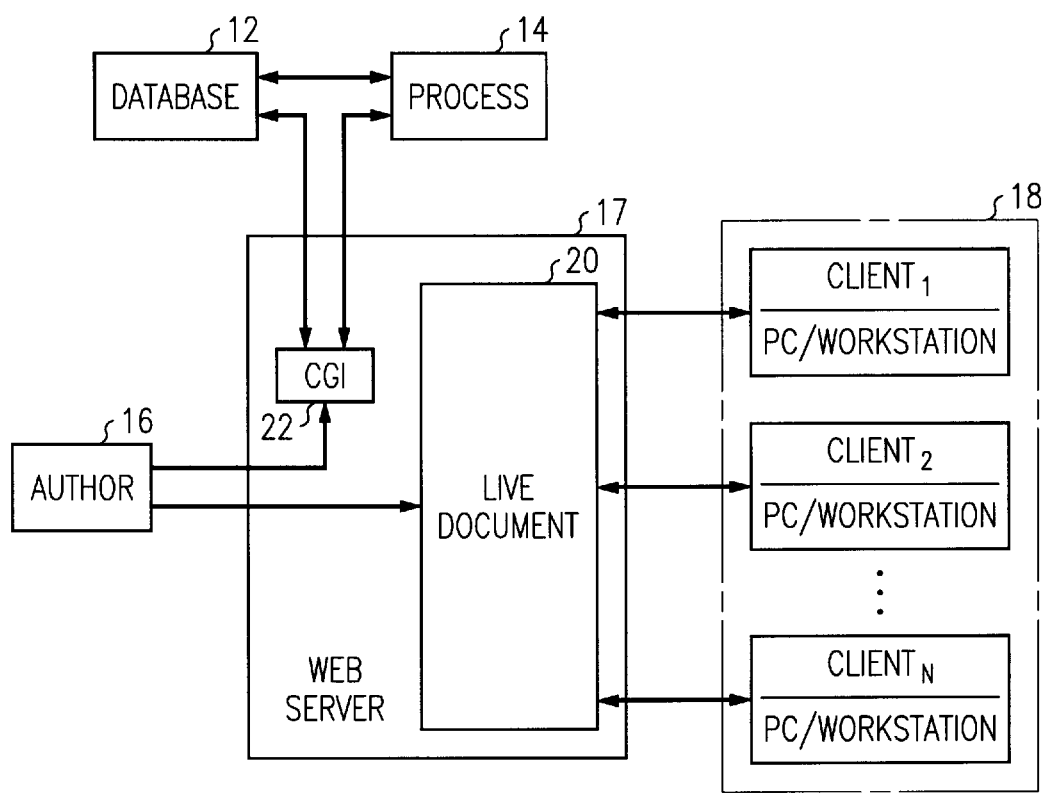
FIG. 1 is a block diagram of a system including a system in accordance with the present invention.

In an embodiment of the invention, a system includes a database 12 containing a large amount of data and software in source code, some of which may be sensitive or confidential. A process 14 provides real time changes to the source code and data files in data base 12. Software developers access code files and the data files in the data base 12 and develops and modify code and returns the files for the data to the database 12.

An author 16 wishes to share the information for the data base 12 with a variety of clients 18. The clients 18 include not only developers of the source code of the database but may also include managers of the developers and those who use the data in the database for purposes of performing an analysis of the data for business analysis purposes.

The author 16 analyses data from the database 12 and develops a document to distribute to the clients 18. However, in view of the dynamic state of the data base 12 and the need to provide a document to meet the needs of an extensive variety of client 18, the desiring to perform a variety of analysis, a document and data can not be realistically provided to meet the requirements of the clients 18 and are of even less value if they do not include real time information from the database 12.

To solve this problem, the author 16 creates a live document 20 providing information in real time from the data base 12 and provides for the clients 18 the capability to perform visually interactive analysis at the client PC/workstation using the web browser on the Internet network.

To create the live document 20, the author 16 writes a description of the process with the associated database in the HTML language for use on a web server 17. The author 18 uses Java script to create hypertext and form-based interactions with the HTML to provide the document and summaries of the data and visualization tools using Java applets, hereafter "applets" within the same HTML document. For more information regarding Java Script refer to *Java Script Handbook* by D. Goodman (1966) published by IDG Book Worldwide, Inc., which is hereby incorporated by reference. For more information regarding Java applets refer to *Java in a Nutshell* by D. Flanagan (1996), published by O'Reilly & Associates, which is hereby incorporated by reference.

The clients 18 users the PC and workstation and the location specified by author on the browser to obtain the live document 20 by downloading the HTML text and applet. The applet has parameters specified by the author 18 and accesses the web server 17 through the CGI a common gateway interface (CGI) 22 with scripts in Perl to receive the summaries from the database 12, which may be quite extensive. For further information concerning the Perl language refer to *Learning Perl* by R. L. Schwartz, 1993, published by O'Reilly and Associates, Sebastopol, which is hereby incorporated by reference. The applet is designed to permit the client to perform interactive queries to the summaries in real time receiving visual displays of the analysis. Depending on the authorization of the client 18, the client 18 may be able to perform analysis from the summaries and data or may be authorized to control the database 12 through the process developing additional input for the database which can be used to modify the database.

Figure 2:
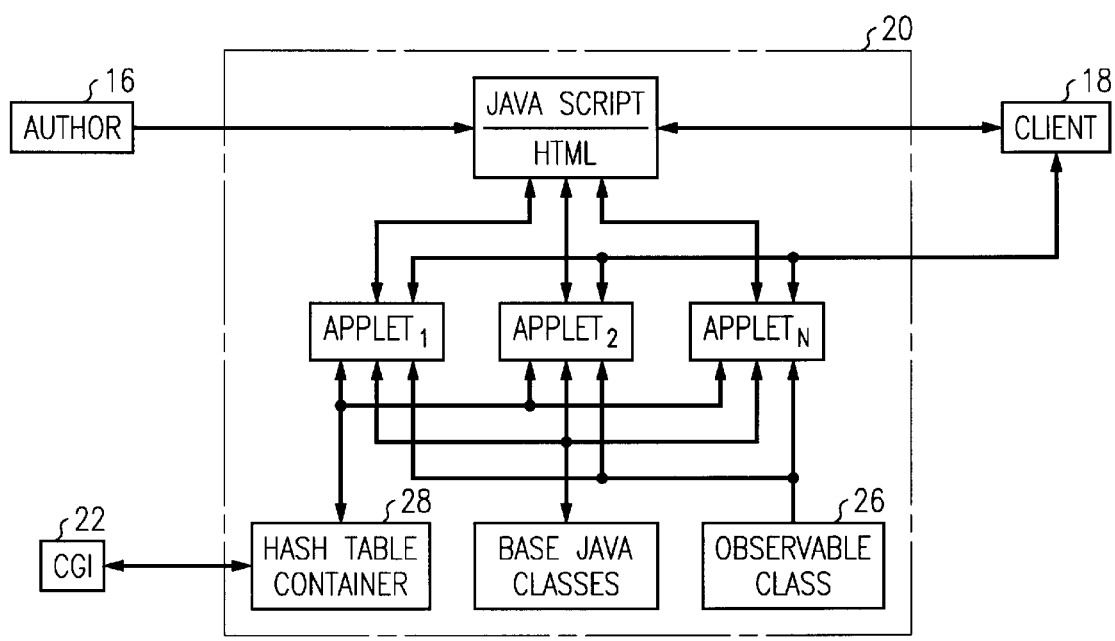
FIG. 2 is a block diagram of a live document in accordance with the invention.

For a more detailed description of the live document 20 refer to FIG. 2. The author 16 writes a document describing the process 14 in HTML in Java script. The document includes illustrations and analysis including applet tags and provides parameters, universal resource locator (URL), which provides access to the data in the data base 12. The applets are derived from base Java classes to provide a common look as feel and well as a mechanism to the applets to communicate with one another and share data. For responsive client interface, the applets, in one embodiment use three independently executing functions, one to read the data as it streams through the network, another to display data as soon as it is available, and a third one to respond to the requests from the client 18. The Base Java Classes implement ways to share the data between the applets and the client 18 by using a class of static member containers to store the references to data sources and with member functions that allow the applets to obtain those references. This strategy allows sharing of the data sources across applets on different pages. The communication between applets is implemented using a static observable class member 26 that notifies all subscribed applets when an appropriate event occurs. Such an event is usually generated by one of the applets in response to client 18 actions.

The document including the HTML and Java scripts and related directories are located on the web server and downloaded and executed on the client's 18 computer. The applets are invoked using applet tags in the HTML document that allow the specification of the Base Java Class for the applet as well as a set of parameters which the author 16 uses to pass information about the initial state of the applet as well as the URL or location of the CGI 22 scripts, to obtain the relevant data and the URL to write desired changes to the data when permitted.

The CGI 22 provides data to the applets. The data is transmitted in compressed binary form in multiple pieces beginning with headers so that the applets on the clients 18 side may start displaying data as soon as the first piece arrives without having to wait for all of the data to be transmitted.

The data is transmitted from CGI 22 to the applets through Hash Table Container 28. However, if the Hash Table Container 28 contains the desired data, the data is passed directly to the applets.

Two approaches may be used to permit only authorized access to the database or authorization to change the database. One approach from the web server side would be to pass data or access to the data base to the client upon showing the appropriate password. The other would be to have the CGI 22 scripts paths translated to pass encrypted data and make the data available and then pass the data to the applet which would then decide what data to show the client in view of establishing the appropriate security.

Figure 4:
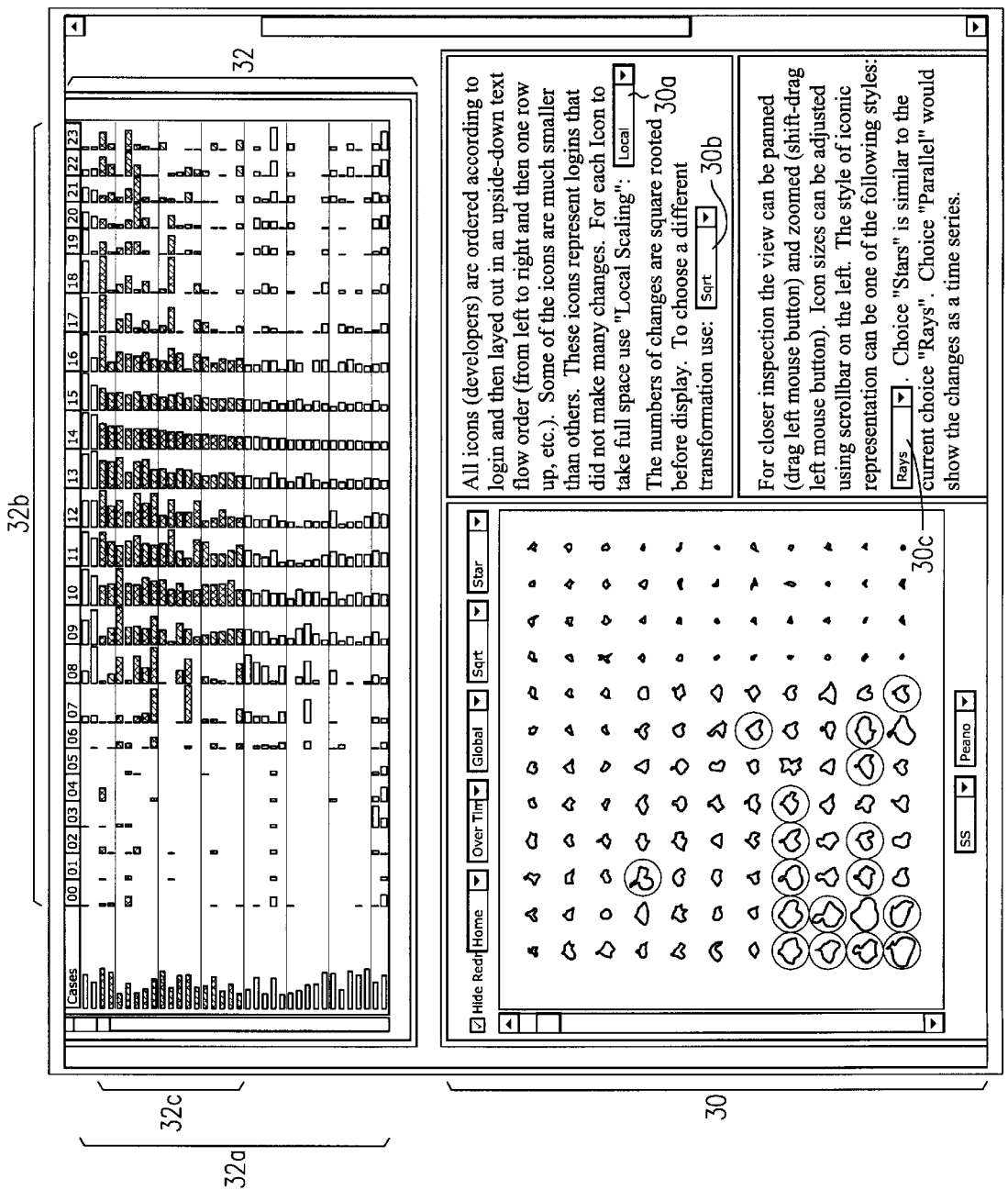
FIG. 4 is another related graphical representation associated with a version of the invention.

The invention may be further understood by referring to an embodiment of the invention pertaining to modeling software changes of large software systems which are very expensive to maintain and improve. Key industrial problems include improving the quality of the software and decreasing maintenance costs, and to solve them it is essential to understand the maintenance process. Since the data associated with software development is highly structured, sequential, and discrete, including code, version control database, and bug reports, it is not immediately clear which variables should be used in regressions and what forms these regression models should take. To understand such data two modeling tools are implemented. The interactive applet tables and a profile view as shown in FIGS. 3 and 4, are used to analyze and to get important in sights from the software change data. These tools are applied to a version control database of a large real time software system to answer basic methodological questions: how should one characterize changes to the code in a change profile? How should one describe developers in terms of those changes in a developer profile? What models are appropriate for software change? The answers to these questions will advance the understanding of complex issues in software engineering.

Particular directions include determining time trends of the changes and obtaining work profiles of individual developers. Managers are interest ed in when changes happen, namely the time of day, closeness to deadlines, and use that information better to allocate the assignments and to recognize abnormal or extreme change patterns. The assessment of developer profiles is important since it is established in the empirical software literature that individual developers can differ by an order of magnitude in certain bug-fixing tasks. For further information on this subject, refer to "Substantiating Programmer Variability" by B. Curtis in *Proceedings of the IEEE,* 69(7):846 which is hereby incorporated by reference. Hence, it is of interest to know what characteristics make some developers much more efficient than others.

To model the change data, basic summaries of the changes were obtained. A number of hierarchies are present in the code change data: for instance, the code can be studied at the subsystem, module, file, or line level, while changes can be grouped by maintenance requests or MRs or by basic changes or deltas. It was necessary to study changes at different levels of the hierarchies.

This task is accomplished by performing the analysis using the live documents which replace static statistical tables and plots in ordinary documents by dynamic Web-based documents, in effect allowing the client to customize the document as it is read. This architecture was used because of the need to share the results with other researchers working on a related project as well as with the developers and their managers. The abundance and complex structure of the data demanded the participation of experts in different domains. The live document provides an environment where developers and experts in software and statistics could perform analyses individually, then provide feedback.

Basic change data was represented as interactive tables and barcharts. Interactive tables were extensively used that follow Rao's Table Lens (see Rao and Card 1994). Those desiring additional information concerning Rao's Table Lens are referred to Proceedings of ACM Conference on Human Factors in Computing Systems (CHI'94), pages 318–322, Boston, Mass., which is hereby incorporated by reference. These tables show numeric and textual data with the variable names across the top and values for each observation in row-ordered cells. Three representations of data values are possible, depending on available screen space: as textual numeric digits, as thin bars with lengths proportional to the values, and as a combination of these two, with the digits overplotted on the bars. The rows of the table can be sorted to show correlations among the variables. The scrollbar on the left side of the view controls the available screen space and scrolls the table.

Using such tables we describe trends of change activity over different time scales: day, week, year, and the lifetime of the system. Since all the developers worked in a single time zone there is a clear hourly trend of activity with one peak after lunch and one before. There is an obvious decrease in activity at night and during lunch time. FIG. 3 shows a Java table applet . The column with averages of added lines shows that the largest changes are being made just before midnight.

Other analysis included change profiles by file types, by months, and by years.

When are developers most productive? The available data contains information on changes to the code made by 509 developers over a 12 year period. Each case in the following analyses corresponds to one developer. The data for each case represent numbers of changes submitted per hour as well as the average numbers of added, deleted, and unchanged lines in changes submitted during that hour.

To investigate developer profiles we used interactive visualization of multiple developers. FIG. 4 at 30 shows a profile applet showing each developer as a small icon. The icon can be described as a clock with 24 hours. Zero hour is at the top and other hours continue at 15 degree intervals clockwise. For each hour we plot a point whose distance from the center is proportional to the value of the variable for that hour. The points are then connected by lines, forming a starlike shape.

FIG. 4 at 30 shows a number of important features. First, there is a great difference in the total numbers of changes each developer made over the considered period. This is reflected by difference sizes of the star icons representing each developer. Another striking feature is that different developers have distinct working patterns; some submit changes only during normal business hours, others have more flexible schedules. Looking more closely at a number of productive developers it becomes obvious that in addition to the normal activity there is a peak of activity just before midnight. It appears as a tail at the top of the star, or as a panhandle. Those changes probably reflect the changes made under deadline pressure. Further investigation revealed that after hours changes make up a much higher proportion of changes on weekends than on weekdays. This supports the hypothesis that late night changes are made to meet closing deadlines. Future work will relate those changes to code quality.

FIG. 4 at 30 shows control applets at 30a, 30b and 30c.

FIG. 4 shows a table applet 32. In column 32a, the various, software developers are shown, and the horizontal bar charts at 32b titled "cases" shows the number of changes by a specific software developer, at a specific hour of the day with 00 through 23 representing the hours of the day.

A user may select either icon or records in the table in any subset of the icons or records will appear in both views. For example, 17 cases or developers are selected at 32c in FIG. 4 in the table by the client with a mouse. They can be selected and highlighted in a color. The operation of the applet will cause the corresponding icons to appear in the same color as in the display at 30. Likewise if specific icons are selected the corresponding cases will appear highlighted also. In the example shown in FIG. 4, the 17 selected cases in the table applet appear and are circled in the display at 30.

Two goals are reached by the analysis discussed above. It answered specific questions about change intensity over time and about developer change profiles, and we proposed live document architecture and specific components for the analysis of a large class of problems related to the development and maintenance of software code. This methodology will also be useful for other sorts of complex dynamic data.

It was determined that the daily work patterns suggest that although most of the changes are made during normal business hours, the largest changes are made late at night, probably working under time pressure and potentially compromising the quality of the code. This led to a recommendation for a future study to investigate the relationship between code quality and late night changes.

The profiles of individual developers indicate varying work patterns, some workers adhering to the business day cycles and some having a more flexible schedule. Some developers are equally likely to submit changes during any hour of day and night. The knowledge of the distribution of developer activity over the day helps to plan for adequate computing resources. Study of the profiles revealed that a very large number of the most productive developers exhibit an unexpected sharp increase in activity shortly before midnight. This indicates a substantial number of changes might be submitted under time pressure.

The live document architecture of combining a written document with interactive analysis tools available through ubiquitous Internet browser interfaces proved essential in obtaining significant results. Part of the success came from the ability to get immediate and critical feedback about the analysis directions from other group members. Although the interactive table is a simplistic modeling tool, it proved to be very effective in describing and analyzing large two dimensional relations, time vs. another parameter. The profile view was needed to analyze three dimensional relationships, developer vs. time vs. another parameter.

Those skilled in the art who now have the benefit of the present disclosure will appreciate that the present invention may take many forms and embodiments. Some embodiments have been presented and described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

What is claimed is:

1. A method for interactive analysis and display of data from a common data base from a plurality of computer terminals interconnectable with the data base through a network, comprising the steps of:

producing real time summaries of the data within the network;

storing a live document program within the network for enabling real time displays of the summaries of the data;

selectively down loading the live document program to at least one of said plurality of computer terminals;

assessing through the network from the at least one of said plurality of computer terminals the real time summaries of the data;

employing the live document program for selectively analyzing and displaying the summaries of the data on a real time basis.

2. The method of claim 1 including the step of providing said live document program with a description of the process in HTML language for use with a commercial network web server.

3. The method of claim 2 in which the live document program includes hypertext and form-based interactions with the HTML written in Java script with Java applets.

4. The method of claim 3 including the step of selectively employing the Java applets to obtain different visual displays of the summaries in response to interactive queries to the summaries in real time from at least one computer terminal.

5. The method of claim 4 including the step of establishing the applets by using bases classes.

6. The method of claim 1 in which the step of accessing is performed through the use of a live document program after being downloaded to the at least one computer terminal.

7. The method of claim 6 in which said live document program includes a security subprogram which prevents display of at least one selected part of the data unless preselected security requirements are satisfied at the at least one computer terminal.

8. The method of claim 7 including the step of selectively decoding encrypted data only if the preselected security requirements are satisfied.

9. The method of claim 1 including the step of passing the summaries of data to the plurality of computer terminals through a common gate interface.

10. The method of claim 1 including the step of selectively altering the live document program downloaded into the at least one computer terminal from the at least one computer terminal to vary the analyzing and displaying of the summaries of the data on an interactive basis.

11. The method of claim 10 in which said step of altering is performed by the steps of altering Java applets of the live document program.

12. A system for selective analysis and display of information from a common data base at a plurality of sites connectable with the data base through a network, comprising:

a plurality of computer terminals at said plurality of sites;

means for storing a live document program within the network for enabling selective analysis and display of the data;

means for selectively downloading the live document program within the network to said plurality of computers to enable said computer terminals to selectively analyze and display the data at said computer terminals.

13. The system of claim 12 in which said common data base is affected by a process and the live document program includes a description of the process in HTML language for use with a commercial network web server.

14. The system of claim 13 in which said live document program includes hypertext and form-based interactions with the HTML written in Java script with Java applets.

15. The system of claim 14 in which said live document program after being downloaded to one of said plurality of computers is enabled to selectively alter said applets to alter the analysis and display of the data from the common data base.

16. The system of claim 12 including a central gate interface for interfacing the computer terminals with the network, the common data base and the storing means.

17. The system of claim 16 including a hash table container interposed between the central gate interface and the computer terminals.

18. The system of claim 12 including an observable class associated with applets of the live document program.

19. The system of claim 12 in which said live program includes Java applets formed from the base Java classes.

20. The system of claim 12 in which the live document program includes a security subprogram which prevents display of at least one selected part of the data unless preselected security requirements are satisfied at the computer terminals.

* * * * *